United States Patent
Tan et al.

(10) Patent No.: US 8,209,464 B2
(45) Date of Patent: Jun. 26, 2012

(54) MANAGEMENT METHOD, MANAGEMENT APPARATUS, AND CONTROLLER FOR MEMORY DATA ACCESS

(75) Inventors: Shuang-Yi Tan, Chiayi (TW); Cheng-Hui Yang, Hsinchu (TW); Chia-Hao Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 1079 days.

(21) Appl. No.: 12/119,696

(22) Filed: May 13, 2008

(65) Prior Publication Data

US 2009/0240868 A1 Sep. 24, 2009

(30) Foreign Application Priority Data

Mar. 24, 2008 (TW) ............................... 97110418 A

(51) Int. Cl.
*G06F 13/00* (2006.01)
(52) U.S. Cl. ................................. 711/103; 711/E12.008
(58) Field of Classification Search .................. None
See application file for complete search history.

(56) References Cited

U.S. PATENT DOCUMENTS

| 6,871,259 B2 * | 3/2005 | Hagiwara et al. ............. 711/103 |
| 7,783,955 B2 * | 8/2010 | Murin ........................... 714/763 |

* cited by examiner

*Primary Examiner* — Hetul Patel
(74) *Attorney, Agent, or Firm* — J.C. Patents

(57) ABSTRACT

A management method, a management apparatus, and a controller for memory data access are provided. The management apparatus is disposed between a host and a device for managing the data transmitted between the host and the device, wherein the management apparatus includes a control unit and a storage unit. When the control unit receives a data writing command from the host, it searches for a set mapped to the data in the storage unit and updates the data in the set. Then, the control unit collects the other parts of the data in the storage unit and the device, integrates all parts of the data, and writes the integrated data into the device. Accordingly, the efficiency in data transmission can be improved, and the number of data writing operations can be reduced so that the lifespan of the device can be prolonged.

21 Claims, 6 Drawing Sheets

MANAGEMENT METHOD, MANAGEMENT APPARATUS, AND CONTROLLER FOR MEMORY DATA ACCESS

CROSS-REFERENCE TO RELATED APPLICATION

This application claims the priority benefit of Taiwan application serial no. 97110418, filed on Mar. 24, 2008. The entirety of the above-mentioned patent application is hereby incorporated by reference herein and made a part of specification.

BACKGROUND OF THE INVENTION

1. Field of the Invention

The present invention generally relates to a method and an apparatus for memory management, and in particular, to a management method, a management apparatus, and a controller for memory data access.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. Besides, flash memory is also broadly applied to external products such as flash cards and flash drives. Thereby, flash memory has become one of the most focused electronic products in recent years.

Flash memories can be categorized into single level cell (SLC) NAND flash memories and multi level cell (MLC) NAND flash memories according to the type of the memory cells thereof. A flash memory is usually divided into a plurality of physical blocks, which will be referred to as blocks thereinafter for the convenience of description. Generally speaking, a flash memory is erased in unit of blocks, namely, each block contains the smallest number of memory cells which are erased together. Each block is usually divided into a plurality of pages. The page is usually the smallest unit for program the flash memory, namely, page is the smallest unit for writing or reading data. However, it has to be noted that the smallest programming unit may also be a sector in another flash memory design, such as a SLC NAND flash memory using the number of program (NOP) as 4.

However, because data is written into a flash memory in unit of pages or sectors, at least a page or a sector has to be programmed whenever a data is written into the flash memory regardless of the quantity of the data. Besides, an erasing operation has to be performed on the flash memory (in unit of blocks) in order to update the data previously recorded therein. Such frequent writing and erasing operations will shorten the lifespan of the flash memory and reduce the efficiency in data transmission.

SUMMARY OF THE INVENTION

Accordingly, the present invention is directed to a management method for memory data access, in which the data to be written into a memory is integrated in advance and then written into the memory so that the efficiency in data transmission can be improved.

The present invention is directed to a management apparatus for memory data access, in which memory data accessing operations are managed by an independent control unit and an independent storage unit so that the convenience in data management can be improved.

The present invention is directed to a controller for memory data access, in which the data to be accessed is stored and managed in an external storage unit according to a host command so that the efficiency in data transmission and data management can be optimized.

The present invention provides a management method for memory data access. The management method is suitable for using a control unit disposed between a host and a device to manage data transmitted between the host and the device, in which the control unit is connected to a storage unit. The management method includes following steps. First, the host receives a data writing command, in which the data writing command indicates a data to be written into the device by the host. Next, a set mapped to the data is searched for in the storage unit so as to update the data in the set. After that, other parts of the data are collected and integrated with the updated data, and the integrated data is then written into the device.

According to an embodiment of the present invention, the step of searching for the set mapped to the data in the storage unit so as to update the data in the set includes searching for the set mapped to the data in a data integration area of the storage unit so as to update the data in the set; searching for the set mapped to the data in a data buffer area of the storage unit so as to update the data in the set if the set mapped to the data is not found in the data integration area; and searching for a blank set in the data buffer area and writing the data into the blank set if the set mapped to the data is neither found in the data integration area nor in the data buffer area.

According to an embodiment of the present invention, in the step of searching for a blank set in the data buffer area and writing the data into the blank set, if there is no blank set found in the data buffer area, the data in a block of the data buffer area is moved to the data integration area, and then the data to be written is written into the block of the data buffer area. The step of moving the data in this block of the data buffer area to the data integration area is to move the data in the block of the data buffer area having oldest data to the data integration area.

According to an embodiment of the present invention, after the step of moving the data in the block of the data buffer area to the data integration area, the management method further includes collecting other parts of the data which is moved to the data integration area, integrating all parts of the data, and writing the integrated data into the device.

According to an embodiment of the present invention, the data stored in the data buffer area is divided into a plurality of sets through a set associative method, in which each of the sets includes a plurality of blocks.

According to an embodiment of the present invention, the step of collecting other parts of the data, integrating all parts of the data, and writing the integrated data into the device includes collecting the other parts of the data in the storage unit and then collecting the other parts of the data in the device, integrating all parts of the data, and writing the integrated data into the device.

According to an embodiment of the present invention, the management method further updates a corresponding flag in a flag area of the storage unit whenever the step of updating or writing the data is executed.

According to an embodiment of the present invention, the management method further adds an error correcting code (ECC) to the data received from the host and then writing the data into the storage unit.

According to an embodiment of the present invention, the management method further receives a data reading command from the host, searches for the data to be read in the storage unit, and transmits the data to the host, in which if the data is not found in the storage unit, the management method further searches for the data to be read in the device and transmits the data to the host.

According to an embodiment of the present invention, the step of searching for the data to be read in the storage unit and transmitting the data to the host includes searching for the data to be read in the data integration area of the storage unit and transmitting the data to the host, in which if the data is not found in the data integration area, the step further includes searching for the data to be read in the data buffer area and transmitting the data to the host.

According to an embodiment of the present invention, the management method further establishes an integration block in the data integration area, sequentially moves the blocks in each set of the data buffer area to the integration block, collects and integrates other parts of the data in the block, and writes the integrated data into the device when receiving a data rearrangement command, in which the data rearrangement command may be issued by the host or by the control unit when the data buffer area of the storage unit is full.

The present invention provides a management apparatus for memory data access, in which the management apparatus is disposed between a host and a device for managing a data transmitted between the host and the device. The management apparatus includes a storage unit and a control unit. The storage unit is used for storing data received from the host. The control unit is used for searching for a set mapped to the data indicated by the data writing command in the storage unit so as to update the data in the set, collecting other parts of the data, integrating the other parts of the data with the updated data, and writing the integrated data into the device when the control unit receives a data writing command from the host.

According to an embodiment of the present invention, the storage unit includes a data buffer area and a data integration area. The data buffer area stores a plurality of sets, in which the data received from the host is divided into a plurality of sets through a set associative method and each of the sets includes a plurality of blocks. The data integration area receives and stores the data moved from the data buffer area and the other parts of the data collected by the control unit.

According to an embodiment of the present invention, the control unit first searches for the set mapped to the data in the data integration area so as to update the data in the set. If the control unit cannot find the set mapped to the data in the data integration area, it searches for the set mapped to the data in the data buffer area so as to update the data in the set. If the control unit cannot find the set mapped to the data in the data integration area and the data buffer area, it searches for a blank set in the data buffer area and writes the data into the blank set.

According to an embodiment of the present invention, the control unit further receives a data reading command from the host, searches for the data to be read in the storage unit and the device, and transmits the data to the host. Besides, the control unit also receives a data rearrangement command, establishes an integration block in the data integration area, sequentially moves the blocks in each set of the data buffer area to the integration block, collects and integrates other parts of the data in the block, and writes the integrated data into the device.

According to an embodiment of the present invention, the storage unit further includes a flag area for recording flags mapped to the data stored in the data buffer area and the data integration area, and the control unit updates the corresponding flag in the flag area whenever the step of updating or writing the data is executed.

According to an embodiment of the present invention, the management apparatus further includes an error correction unit for adding an ECC to the data received from the host.

The present invention provides a controller including a microprocessor unit, a host connecting interface, a memory connecting interface, and a memory management module. The microprocessor unit is used for controlling the operation of the controller. The host connecting interface is coupled to the host and the microprocessor unit, and the memory connecting interface is coupled to the device and the microprocessor unit. The memory management module is also coupled to the microprocessor unit and is suitable for managing the data transmitted between the host and the device through the microprocessor unit. When the microprocessor unit receives a data writing command from the host through the host connecting interface, it searches for a set mapped to the data indicated by the data writing command in the storage unit coupled to the microprocessor unit so as to update the data in the set, then collects the other parts of the data, integrates the other parts of the data with the updated data, and writes the integrated data into the device through the memory connecting interface.

According to an embodiment of the present invention, the controller further includes an error correction unit coupled to the microprocessor unit for adding an ECC to the data received from the host.

According to an embodiment of the present invention, the memory management module further searches for the data to be read in the storage unit and the device and transmits the data to the host through the host connecting interface when the microprocessor unit receives a data reading command from the host through the host connecting interface.

According to an embodiment of the present invention, the memory management module further establishes an integration block in the storage unit, sequentially moves the data in one of a plurality of blocks of the storage unit to the integration block, collects and integrates the other parts of the data in the block, and writes the integrated data into the device through the memory connecting interface when the microprocessor unit receives a data rearrangement command.

According to an embodiment of the present invention, the device includes a flash memory, and the storage unit includes one of a synchronous dynamic random access memory (SDRAM) and a double data rate synchronous dynamic random access memory (DDR SDRAM).

In the present invention, a controller and a storage unit are disposed between a host and a device, and the data to be written into the device is transmitted into the storage unit and integrated with the data previously stored in the storage unit or read by the device, so that the data can be written together into the device. Thereby, the efficiency in data transmission and data management can be optimized.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
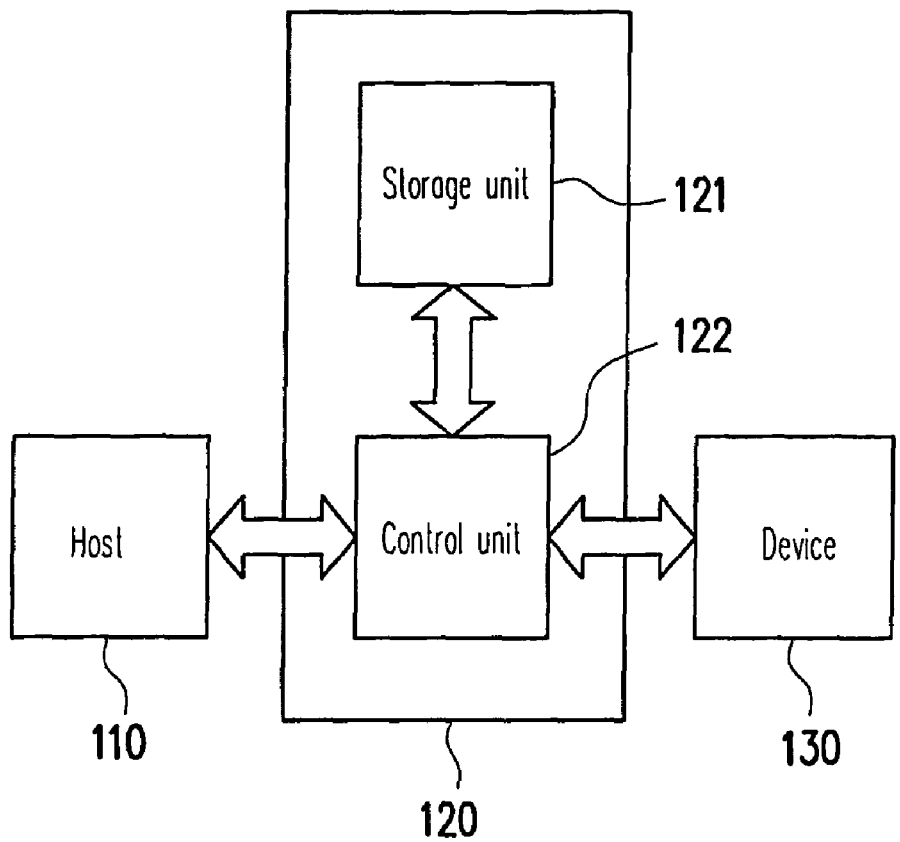
FIG. 1 is a schematic diagram illustrating management structure for memory data access according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the present invention, a controller and a storage unit (for example, a dynamic random access memory (DRAM)) are disposed between two data transmission ends. The transmitted data is stored in the storage unit through the coordination of the controller so as to manage the data as a whole, and after that, the data is transmitted to and stored in the destination so as to increase the efficiency in data transmission. Embodiments of the present invention will be described below with reference to accompanying drawings.

First Embodiment

FIG. 1 is a schematic diagram illustrating management structure for memory data access according to a first embodiment of the present invention. Referring to FIG. 1, in the management structure 100 of the present embodiment, a management apparatus 120 is disposed between a host 110 and a device 130 for managing the data transmitted between the host 110 and the device 130. The host 110 may be portable electronic device such as a computer or a personal digital assistant (PDA), and the device 130 may be a flash memory, but not limited to it.

The management apparatus 120 includes a storage unit 121 and a control unit 122. The storage unit 121 may be a volatile memory, such as a synchronous dynamic random access memory (SDRAM) or a double data rate synchronous dynamic random access memory (DDR SDRAM), and the storage unit 121 is used for storing data received from the host 110. Such a memory can provide large storage capacity and high efficiency so that the efficiency of data transmission can be improved.

The control unit 122 is connected to the host 110 and the device 130 for managing the data transmitted between the host 110 and the device 130. When the control unit 122 receives a data writing command from the host 110, the control unit 122 searches for a set mapped to the data indicated by the data writing command in the storage unit 121 so as to update the data in the set, and at the same time, the control unit 122 collects the other parts of the data to integrate with the updated data and writes the integrated data into the device 130. Since the data written into the device 130 has been integrated instead of being written randomly, the number of writing data into the device 130 can be reduced, and accordingly the lifespan of the device 130 can be prolonged.

Figure 2:
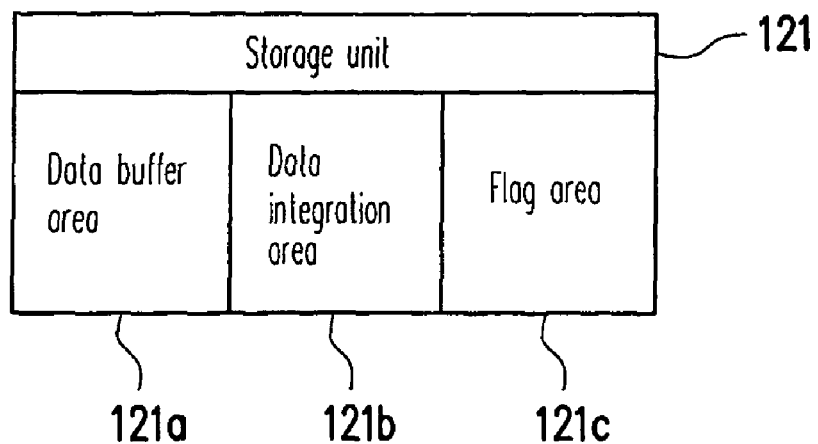
FIG. 2 is a schematic diagram illustrating a storage unit according to the first embodiment of the present invention.

FIG. 2 is a schematic diagram illustrating a storage unit according to the first embodiment of the present invention. Referring to both FIG. 1 and FIG. 2, in the present embodiment, the storage unit 121 is divided into a data buffer area 121a, a data integration area 121b, and a flag area 121c, and the control unit 122 is used for managing the data stored in these areas so as to increase the efficiency in data transmission.

In the present embodiment, an N-way set associative method is used for storing the data received from the host 110 into the data buffer area 121a. It should be mentioned herein that the present invention is not limited to foregoing method, and a direct mapping method or a full associative method may also be used as the data management method.

Figure 3:
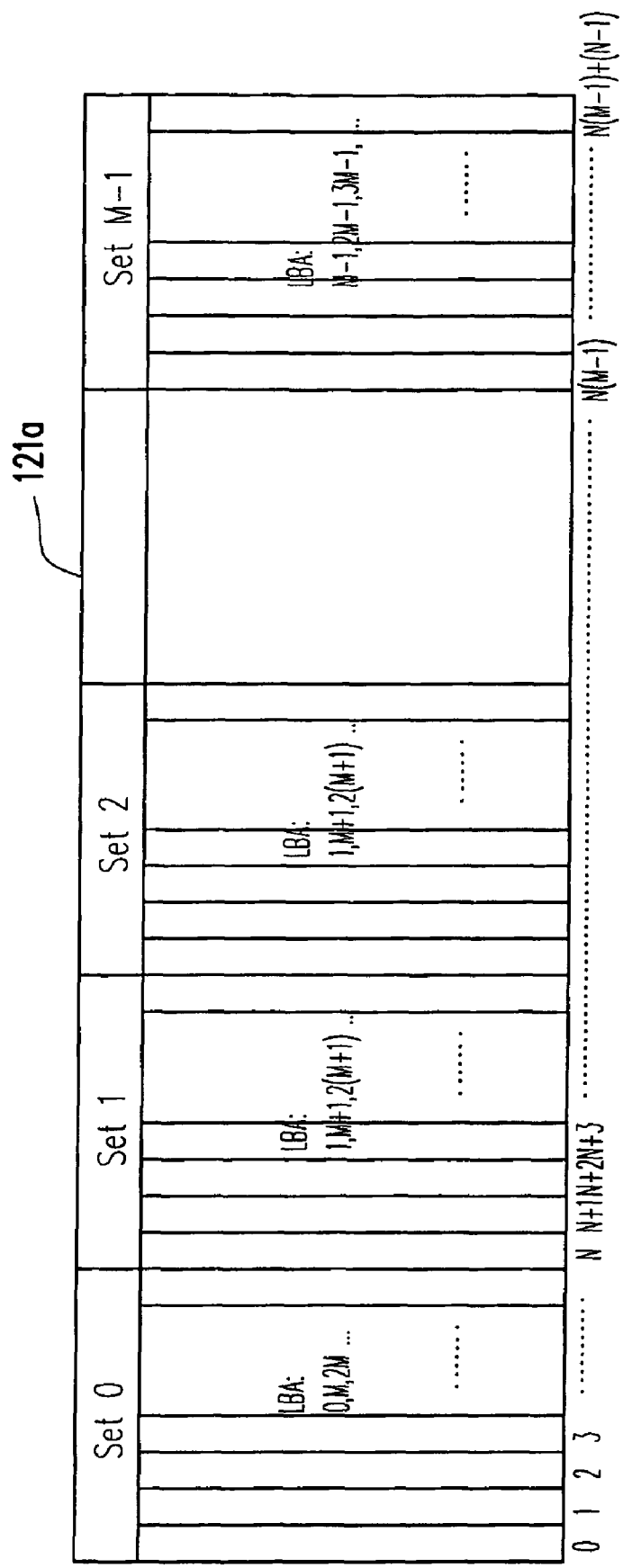
FIG. 3 is a schematic diagram illustrating a data buffer area according to the first embodiment of the present invention.

FIG. 3 is a schematic diagram illustrating a data buffer area according to the first embodiment of the present invention. Referring to FIG. 3, the data buffer area 121a is divided into M sets (including set 0~set M−1), and each set is further divided into a plurality of blocks according to the corresponding logical block address (LBA) thereof. For example, the set 0 includes block 0~block N−1, in which M and N are both positive integers.

If a specific set in the data buffer area 121a is already full of data received from the host 110, the control unit 122 searches for the block having oldest data in the set and moves the data in this block to the data integration area 121b. The emptied block in the data buffer area 121a can then be used for receiving data from the host 110. The data can be moved in unit of sectors, pages, or blocks.

On the other hand, when the data integration area 121b receives the data moved from the data buffer area 121a, the control unit 122 further searches for other parts of the data to be integrated with the data and then writes the integrated data into the device 130. To be specific, the control unit 122 collects the other parts of the data first in the storage unit 121 and then in the device 130. After that, the control unit 122 integrates the collected data with the original data and writes the integrated data into the device 130. Since the data eventually written into the device 130 has been integrated, the conventional problem of frequent data accessing when writing small quantity of data can be resolved.

The flag area 121c is used for recording flags corresponding to the data stored in the data buffer area 121a and the data integration area 121b. The control unit 122 updates the corresponding flag in the flag area 121c whenever data is updated or written so that the flag can be used as a reference when next time data is updated or written.

It should be mentioned that in the present embodiment, a temporary data storage area (not shown) is further reserved in the storage unit 121 to be used by the control unit 122 flexibly, in which the temporary data storage area can be used for temporarily storing some data or used as a space for exchanging data. On the other hand, an error correction unit (not shown) may be further disposed in the management apparatus 120 for adding an error correcting code (ECC) to the data received from the host 110 so that data can be corrected during data transmission. The error correction unit can be switched on/off. The error correction unit adds the ECC to the data received from the host 110 when it is turned on, in which the ECC can be stored in foregoing temporary data storage area or sent to the device 130 to correct data.

Through the interaction between the data buffer area 121a, the data integration area 121b, and the flag area 121c, the control unit 122 can execute a corresponding data access operation, such as data writing, data reading, and data integration etc, according to the command issued by the host 110.

These data access operations will be respectively described below with reference to an embodiment of the present invention.

Second Embodiment

Figure 4:
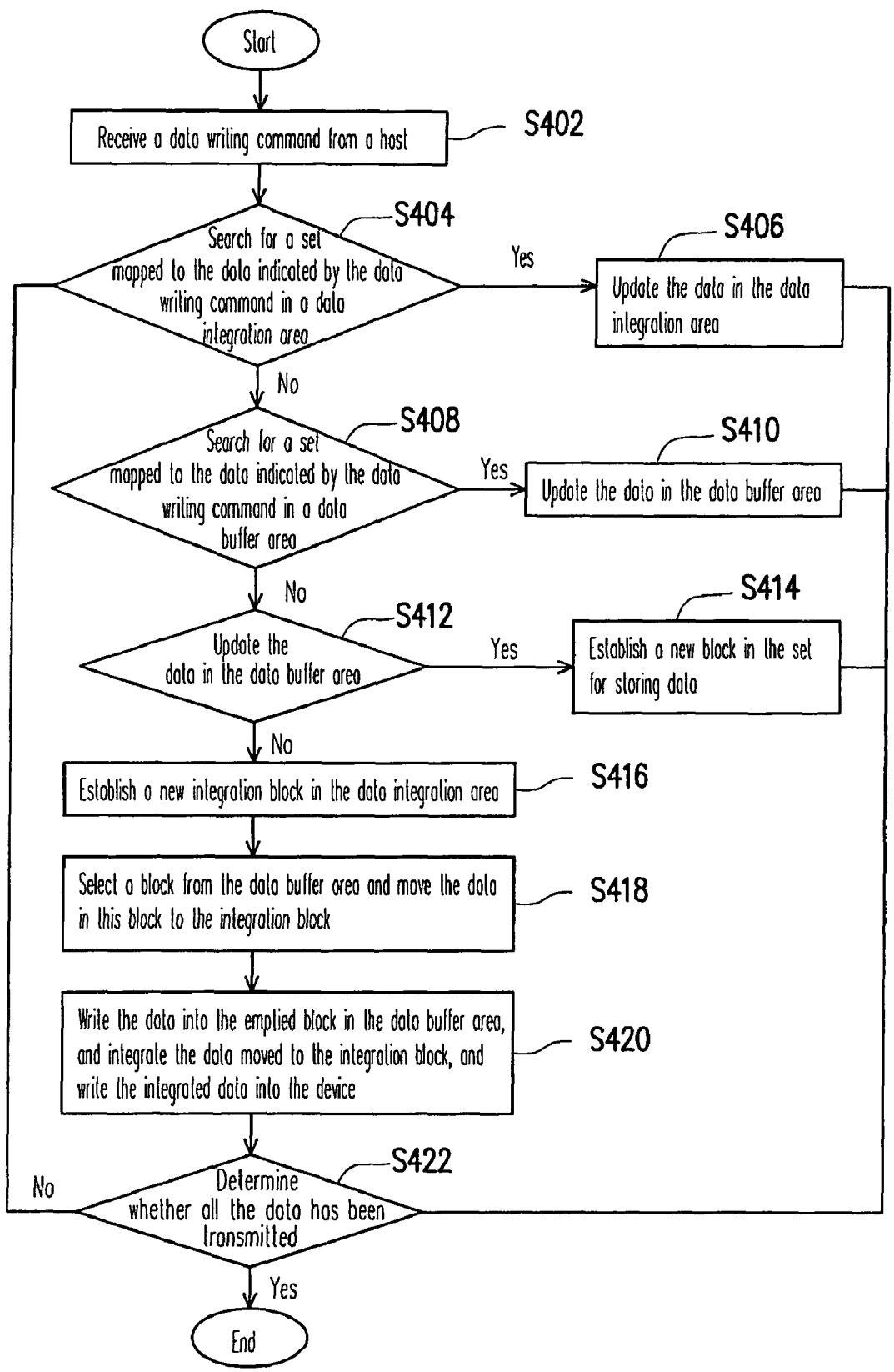
FIG. 4 is a flowchart of a management method for memory data writing according to a second embodiment of the present invention.

As for data writing, FIG. 4 is a flowchart of a management method for memory data writing according to the second embodiment of the present invention. Referring to FIG. 4, the present embodiment is suitable for the management structure described in the first embodiment, in which when the control unit receives a data writing command, it integrates the data received from the host and writes the integrated data into the device, so as to reduce the number of data writing. The method includes following steps.

First, the control unit receives a data writing command from the host (step S402), in which the data writing command indicates the data to be written. Next, the control unit searches for a set mapped to the data indicated by the data writing command in the data integration area so as to update the data in the set (step S404).

If the control unit finds the set mapped to the data in the data integration area, the control unit updates the data in the data integration area (step S406) and updates the flag corresponding to the data integration area in the flag area; otherwise, if the control unit cannot find the set mapped to the data in the data integration area, it searches for the set mapped to the data in the data buffer area (step S408).

If the control unit finds the set mapped to the data in the data buffer area, it updates the data in the data buffer area (step S410) and updates the flag corresponding to the data buffer area in the flag area; otherwise, if the control unit cannot find the set mapped to the data in the data buffer area, it searches for a blank set in the data buffer area (step S412).

If the control unit finds a blank set in the data buffer area, it establishes a new block in the set for storing data (step S414) and updates the flag corresponding to the data buffer area in the flag area. However, if the control unit cannot find a blank set in the data buffer area, it establishes a new integration block in the data integration area (step S416), selects a specific block from the data buffer area, and moves the data in the block to the integration block (step S418). The block selected by the control unit may be the block having oldest data in the data buffer area.

After moving the data to the integration block, the control unit writes the data into the emptied block in the data buffer area, and integrates the data moved to the integration block and writes the integrated data into the device (step S420). Finally, the control unit determines whether all the data has been transmitted (step S422). If the data has not been completely transmitted, the process returns to step S404 to continue to transmit data; otherwise, the entire data transmission process is ended.

Through foregoing data writing process, the data to be written into the device by the host can be integrated and written together into the device, so that the number of writing data into the device can be reduced, and accordingly the lifespan of the device can be prolonged.

Third Embodiment

Figure 5:
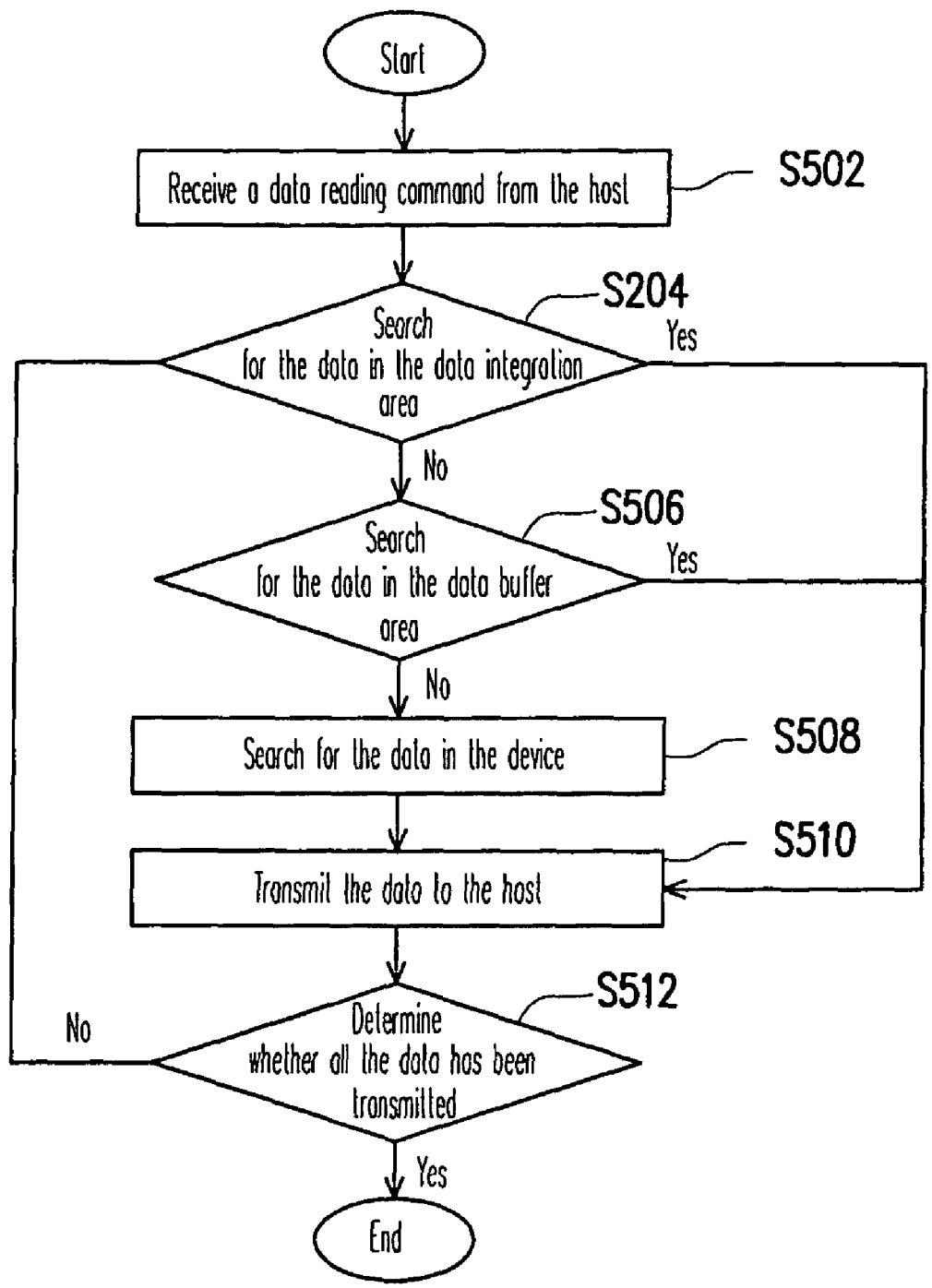
FIG. 5 is a flowchart of a management method for memory data reading according to a third embodiment of the present invention.

As for data reading, FIG. 5 is a flowchart of a management method for memory data reading according to the third embodiment of the present invention. Referring to FIG. 5, the present embodiment is suitable for the management structure in the first embodiment, in which when the control unit receives a data reading command, it searches for the desired data in the storage unit and the device sequentially so as to increase the efficiency in data reading. The method includes following steps.

First, the control unit receives a data reading command from the host (step S502), in which the data reading command indicates the data to be read. Next, the control unit searches for the data in the data integration area (step S504).

If the control unit finds the data in the data integration area, it transmits the data to the host (step S510); otherwise, if the control unit cannot find the data in the data integration area, it searches for the data in the data buffer area (step S506).

Similarly, if the control unit finds the data in the data buffer area, it transmits the data to the host (step S510); otherwise, if the control unit does not find the data in the data buffer area, it searches for the data in the device (step S508) so as to transmit the data to the host (step S510). Finally, the control unit determines that whether all the data has been transmitted (step S512). If the data is not completely transmitted, the process returns to step S504 to continue to transmit data; otherwise, the entire data transmission process is ended.

Through foregoing data reading process, the data to be read can be directly obtained from the storage unit, and since the data stored in the storage unit is the latest data, the efficiency in data reading is improved. Besides, the data is only searched for in the device when the data cannot be found in the storage unit. Thus, the number of accessing the device can be reduced and accordingly the lifespan of the device can be prolonged.

Fourth Embodiment

Figure 6:
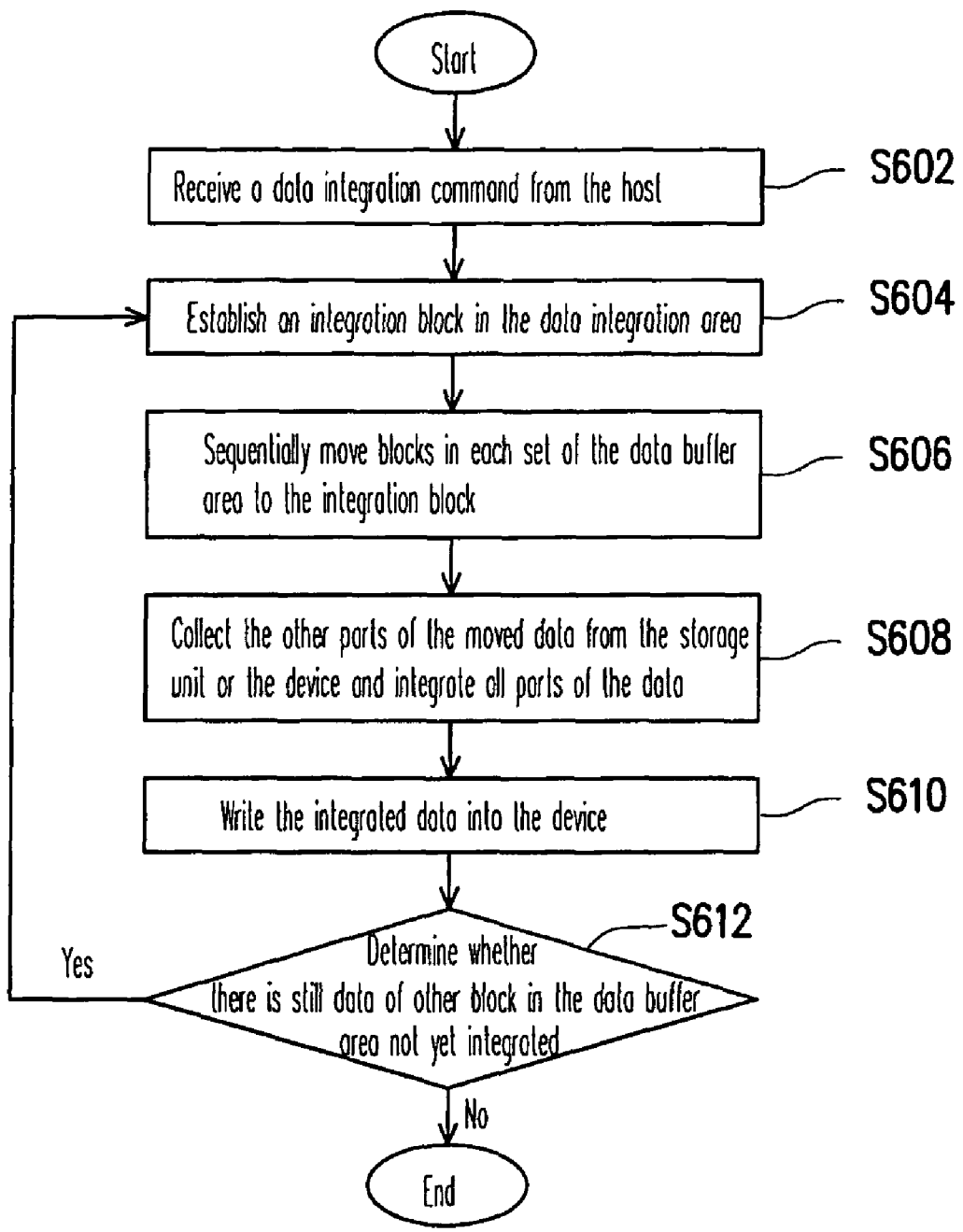
FIG. 6 is a flowchart of a management method for memory data rearrangement according to a fourth embodiment of the present invention.

As for data rearrangement, FIG. 6 is a flowchart of a management method for memory data rearrangement according to the fourth embodiment of the present invention. Referring to FIG. 6, the present embodiment is suitable for the management structure in the first embodiment, in which when the control unit receives a data rearrangement command, the data stored in the storage unit is integrated and the integrated data is then written into the device. The method includes following steps.

First, the control unit receives a data rearrangement command (step S602), in which the data rearrangement command is issued by the host or generated automatically by the control unit when the data buffer area of the storage unit is full of data. Here the data is integrated in order to rearrange older data in the data buffer area and write the integrated data into the device so that the emptied space can be used for storing data received subsequently.

Next, the data rearrangement process is entered. The control unit establishes an integration block in the data integration area (step S604) and then sequentially moves the blocks in each set of the data buffer area to the integration block (step S606). After that, the control unit collects the other parts of the data in the storage unit or the device and integrates these parts of the data (step S608), and eventually, the control unit writes the integrated data into the device (step S610). Finally, the control unit also checks whether there is still data of other blocks in the data buffer area not rearranged every time the control unit completes integrating data of one block (step S612). If there is still data of other block not rearranged, the process returns to step S604 to continue the moving, collecting, and integrating steps until the data of all the blocks and all the sets in the data buffer area has been rearranged.

To be specific, the control unit finds a block in a first set of the data buffer area and moves the data in this block to the integration block so as to integrate the data. After the data in this block is integrated, the control unit continues to move the data of another block. After the data of all the blocks in a set is integrated, the control unit continues to select a next set for integrating the data therein. The moving and integrating steps are repeated and eventually the data buffer area can be emptied for storing data received from the host.

Through foregoing data integration process, the data stored in the data buffer area can be written into the device so as to free some space for storing data received subsequently. Thus, the latest data is kept in the data buffer area and provided to the host, so that the efficiency in data transmission can be improved.

Fifth Embodiment

Figure 7:
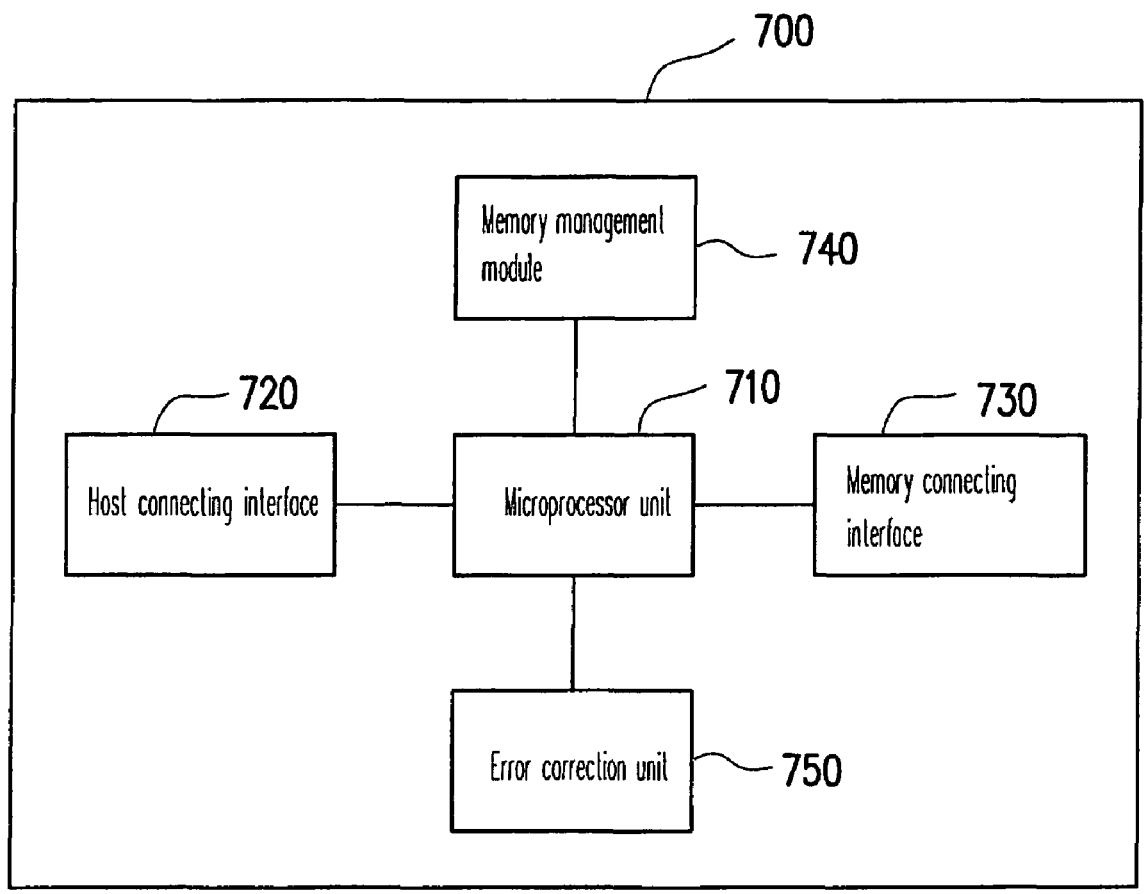
FIG. 7 is a block diagram illustrating a controller for memory data access according to a fifth embodiment of the present invention.

According to the management structure and management method for memory data access described above, the present invention further provides a controller for executing foregoing management method. FIG. 7 is a block diagram illustrating a controller for memory data access according to the fifth embodiment of the present invention. Referring to FIG. 7, in the present embodiment, the controller 700 is disposed between two data transmission ends (i.e. a host and a device) for managing the data transmitted between the host and the device. The controller 700 includes a microprocessor unit 710, a host connecting interface 720, a memory connecting interface 730, a memory management module 740, and an error correction unit 750, and the controller 700 is connected to a storage unit (not shown).

The microprocessor unit 710 may be a microprocessor used for controlling the operation of the controller. The host connecting interface 720 provides an interface for connecting the controller 700 to an external host, and the memory connecting interface 730 provides an interface for connecting the controller 700 to an external device. Besides, the error correction unit 750 is used for adding an error correcting code (ECC) to the data received from the host so as to correct the data during data transmission.

It should be noted that the memory management module 740 is connected to the microprocessor unit 710 so as to manage the data transmitted between the host and the device through the microprocessor unit: 710. To be specific, when the microprocessor unit 710 receives a data writing command from the host through the host connecting interface 720, it searches for a set mapped to the data in the storage unit connected externally to the controller 700. After that, the microprocessor unit 710 updates the data in the set and collects the other parts of the data to integrate with the data. After that, the microprocessor unit 710 writes the integrated data into the device through the memory connecting interface 730.

On the other hand, when the microprocessor unit 710 receives a data reading command from the host through the host connecting interface 720, the microprocessor unit 710 sequentially searches for the data to be read in the storage unit and the device and transmits the data to the host through the host connecting interface 720.

Additionally, when the microprocessor tuit 710 receives a data rearrangement command, the microprocessor unit 710 establishes an integration block in the storage unit and sequentially moves the data in each block of the storage unit to the integration block, and collects and integrates the other parts of the data in this block, and writes the integrated data into the device through the memory connecting interface 730.

To sum up, according to the management method, management apparatus, and controller for memory data access of the present invention, a controller and a DRAM are disposed between two data transmission ends, and while writing a data, the data is first stored into the DRAM and integrated as a whole. The integrated data is then written into one of the data transmission end. Thereby, the number of data writing is reduced, and the efficiency in data transmission is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A management method for memory data access, suitable for using a control unit disposed between a host and a device for managing data transmitted between the host and the device, wherein the control unit is connected to a storage unit, the management method comprising:

receiving a data writing command from the host, wherein the data writing command indicates first data to be written;

searching for a set mapped to the first data in the storage unit so as to update the data in the set; and collecting second data, integrating the second data with the first data into integrated data, and writing the integrated data into the device, wherein the step of searching for the set mapped to the first data in the storage unit so as to update the data in the set comprises:

searching for the set mapped to the first data in a data integration area of the storage unit so as to update the data in the set;

searching for the set mapped to the first data in a data buffer area of the storage unit so as to update the data in the set if the set mapped to the first data is not found in the data integration area;

searching for a blank set in the data buffer area and writing the first data into the blank set if the set mapped to the first data is not found in the data integration area and the data buffer area; and moving the data in a block of the data buffer area to the data integration area and writing the first data into the block of the data buffer area if there is no blank set in the data buffer area.

2. The management method according to claim 1, wherein the step of moving the data in the block of the data buffer area to the data integration area comprises:

moving the data in the block of the data buffer area having oldest data to the data integration area.

3. The management method according to claim 1, wherein the first data is a part of third data and the second data is other parts of the third data, and the data moved to the data integration is a part of fourth data, wherein after the step of moving the data in the block of the data buffer area to the data integration area, the management method further comprises:

collecting other parts of the fourth data, integrating the other parts of the fourth data with the data moved to the data integration area into first integrated data, and writing the first integrated data into the device.

4. The management method according to claim 1, wherein the data stored in the data buffer area is divided into a plurality of sets through a set associative method, and each of the sets comprises a plurality of blocks.

5. The management method according to claim 1, wherein the step of collecting the other parts of the fourth data, integrating the other parts of the fourth data with the data moved to the data integrated area into the first integrated data, and writing the first integrated data into the device comprises:

collecting a first part of the fourth data in the storage unit;
collecting a second part of the fourth data in the device; and
integrating the first part and the second part of the fourth data with the data moved to the data integrated area into the first integrated data and writing the first integrated data into the device.

6. The management method according to claim 1, further comprising:

updating a corresponding flag in a flag area of the storage unit every time after a step of updating or writing the first data is executed.

7. The management method according to claim 1, further comprising:
adding an error correcting code (ECC) to the data received from the host, and writing the data into the storage unit.

8. The management method according to claim 1, further comprising:
receiving a data reading command from the host, wherein the data reading command indicates the data to be read;
searching for the data to be read in the storage unit and transmitting the data to the host; and
searching for the data to be read in the device and transmitting the data to the host if the data is not found in the storage unit.

9. The management method according to claim 8, wherein the step of searching for the data to be read in the storage unit and transmitting the data to the host comprises:
searching for the data to be read in the data integration area of the storage unit and transmitting the data to the host; and
searching for the data to be read in the data buffer area and transmitting the data to the host if the data is not found in the data integration area.

10. The management method according to claim 1 further comprising:
receiving a data rearrangement command;
establishing an integration block in the data integration area;
sequentially moving a part of fifth data in the blocks in the sets of the data buffer area to the integration block; and
collecting other parts of the fifth data and integrating the other parts of the fifth data with the part of the fifth data in the blocks into second integrated data, and writing the second integrated data into the device.

11. The management method according to claim 10, wherein the data rearrangement command is issued by the host or is issued by the control unit if the data buffer area of the storage unit is full.

12. The management method according to claim 1, wherein the device comprises a flash memory.

13. The management method according to claim 1, wherein the storage unit comprises one of a synchronous dynamic random access memory (SDRAM) and a double data rate synchronous dynamic random access memory (DDR SDRAM).

14. A management apparatus for memory data access, disposed between a host and a device for managing data transmitted between the host and the device, the management apparatus comprising:
a storage unit, including a data buffer area and a data integration area, for storing the data received from the host; and
a control unit, for receiving a data writing command from the host, searching for a set mapped to first data indicated by the data writing command in the storage unit so as to update the data in the set, and collecting second data, integrating the second data with the first data into integrated data, and writing the integrated data from the storage unit into the device,
wherein the control unit first searches for the set mapped to the first data in the data integration area so as to update the data in the set, if the set mapped to the first data is not found in the data integration area, the control unit searches for the set mapped to the first data in the data buffer area so as to update the data in the set, if the set mapped to the first data is not found in the data integration area and the data buffer area, the control unit searches for a blank set in the data buffer area and writes the first data into the blank set,
wherein if there is no blank set in the data buffer area, the control unit moves the data in a block of the data buffer area to the data integration area and writes the first data into the block of the data buffer area.

15. The management apparatus according to claim 14, wherein the data buffer area stores a plurality of sets, wherein the data received from the host is divided into the sets through a set associative method and each of the sets comprises a plurality of blocks,
wherein the data integration area is used for receiving and storing data moved from the data buffer area and the second data collected by the control unit, wherein the first data is a part of third data and the second data is other parts of the third data.

16. The management apparatus according to claim 15, wherein the control unit further receives a data reading command from the host, and searches for the data to be read in the storage unit and the device to transmit to the host.

17. The management apparatus according to claim 15, wherein the control unit further receives a data rearrangement command, establishes an integration block in the data integration area, sequentially moves a part of fifth data in the blocks in the sets of the data buffer area to the integration block, collects other parts of the fifth data and integrates the other parts of the fifth data with the part of the fifth data in the blocks into second integrated data, and writes the second integrated data into the device.

18. The management apparatus according to claim 15, wherein the storage unit further comprises:
a flag area, for recording a flag corresponding to the data stored in the data buffer area and the data integration area.

19. The management apparatus according to claim 18, wherein the control unit updates the corresponding flag in the flag area every time after the step of updating or writing the first data is executed.

20. A controller for memory data access, comprising:
a microprocessor unit, for controlling the operation of the controller;
a host connecting interface, coupled to a host and the microprocessor unit;
a memory connecting interface, coupled to a device and the microprocessor unit; and
a memory management module, coupled to the microprocessor unit for managing data transmitted between the host and the device through the microprocessor unit, wherein
when the microprocessor unit receives a data writing command from the host through the host connecting interface, the memory management module searches for a set mapped to first data indicated by the data writing command in a storage unit coupled to the microprocessor unit and updates the data in the set, collects second data, integrates the second data with the first data into integrated data, and writes the integrated data into the device through the memory connecting interface
wherein the memory management module first searches for the set mapped to the first data in a data integration area of the storage unit so as to update the data in the set, if the set mapped to the first data is not found in the data integration area, the memory management module searches for the set mapped to the first data in a data buffer area of the storage unit so as to update the data in the set, if the set mapped to the first data is not found in the data integration area and the data buffer area, the memory management module searches for a blank set in the data buffer area and writing the first data into the blank set, wherein if there is no blank set in the data buffer area, the memory management module moves the data in a block of the data buffer area to the data integration area and writing the first data into the block of the data buffer area.

21. The controller according to claim 20, wherein the memory management module further comprises:

establishing an integration block in the storage unit, sequentially moving a part of fifth data in one of a plurality of blocks in the storage unit to the integration block, collecting other parts of the fifth data and integrating the other parts of the fifth data with the part of the fifth data in the block into second integrated data, and writing the second integrated data into the device through the memory connecting interface when the microprocessor unit receives a data rearrangement command.

* * * * *